Oct. 15, 1968  TADAHIRO KAJITANI  3,405,664
CAKE STOCK DISPENSING APPARATUS
Filed July 5, 1966  2 Sheets-Sheet 1
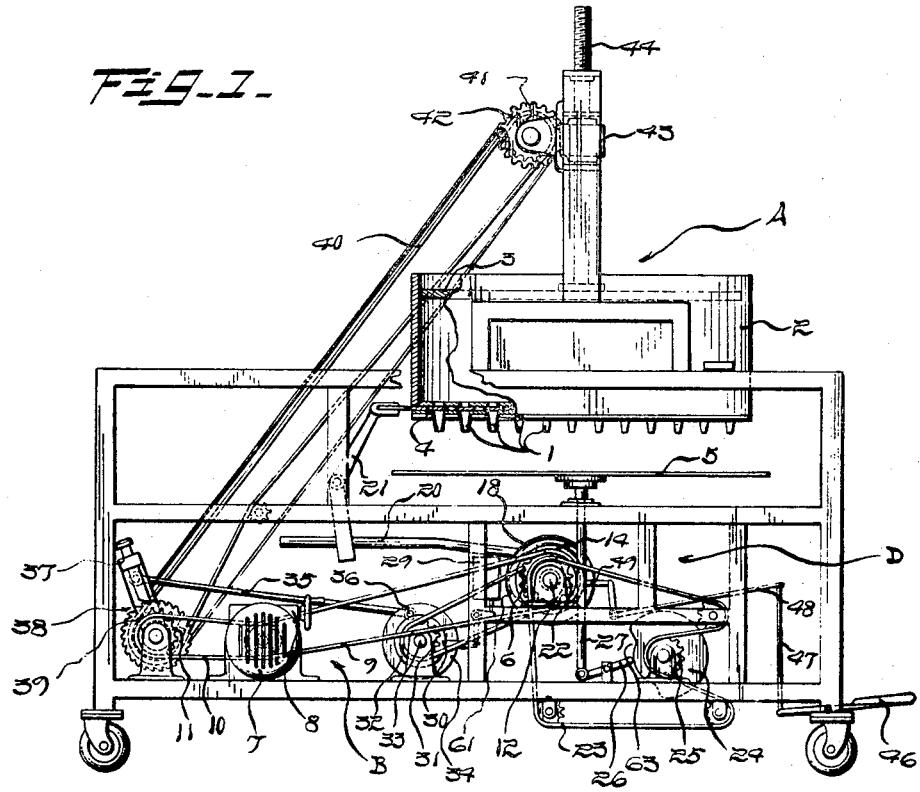
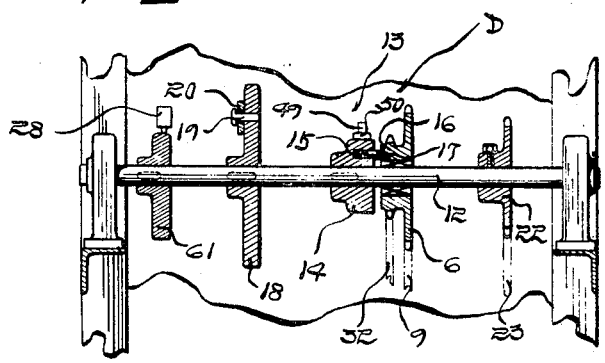
Tadahiro Kajitani,
Inventor
By Wenderoth, Lind & Ponack
Attorneys

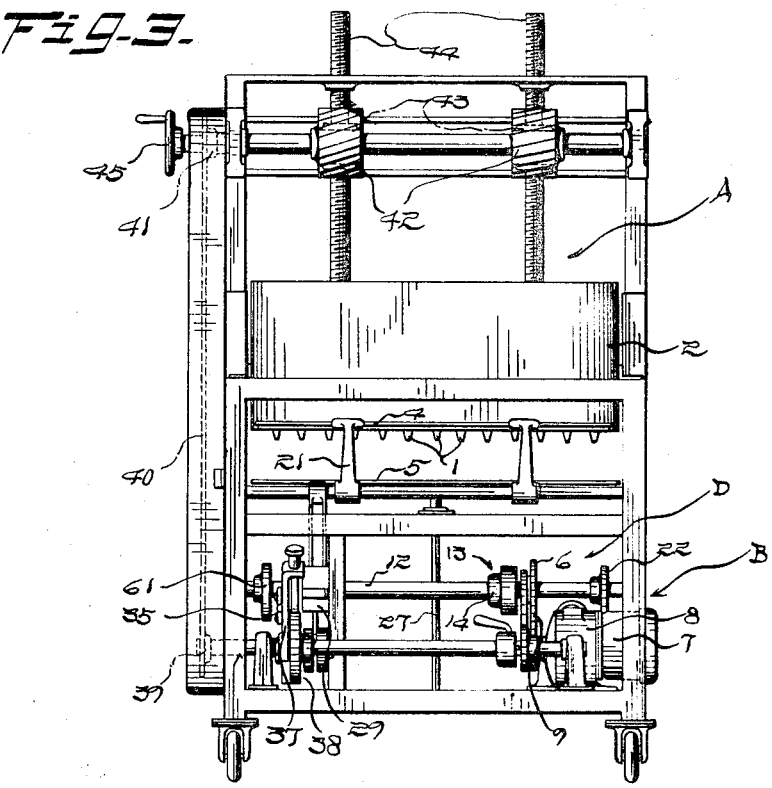

United States Patent Office 3,405,664
Patented Oct. 15, 1968

3,405,664
CAKE STOCK DISPENSING APPARATUS
Tadahiro Kajitani, Higashi 4–3, Hannon-cho,
Abeno-ku, Osaka, Japan
Filed July 5, 1966, Ser. No. 562,890
2 Claims. (Cl. 107—27)

ABSTRACT OF THE DISCLOSURE

A cake stock dispensing apparatus in which a depressing plate is provided in a cake stock container which has a number of restricted openings in the bottom thereof, which openings are controlled by a transversely movable shutter. The apparatus further has a liftable receiving plate below the restricted openings for receiving lumps of the cake stock extruded through the restricted openings. A driving system is coupled to the shutter shifting mechanism, the depressing plate raising and lowering mechanism and the receiving plate raising and lowering mechanism, which driving system is driven from a single shaft which is rotated by a motor through a one-revolution clutch device, so that the single operation of actuating the clutch device carries through an entire cycle of operation of the apparatus.

---

This invention relates to a dispensing apparatus adapted to press out a cake stock such as for rolled sponge cake, cream puff coating, cupped-cake and marshmallow through restricted openings to provide lumps of predetermined size.

A primary object of the present invention is to provide an improved dispenser which is capable of automatically pressing out a number of lumps of such cake stock at a stroke onto a lump receiving plate over the entire surface thereof in a single operation.

Another important object is to provide an automated cake stock dispenser comprising a pressing-out mechanism for pressing out said stock through restricted openings, a mechanism for opening and closing a shutter provided over said restricted openings and a mechanism for moving a receiving plate to the vicinity of the restricted openings so as to assure the timely reception of the lumps being extruded through said openings while keeping them in shape, and wherein said three mechanisms are so adapted that they are fully automatically operated in relation to each other, thus making it possible to obtain a number of cakes at the same time and continuously.

The other objects and many of the attendant advantages of the invention will be readily appreciated as the same becomes better understood by reference to the following detailed description when considered in connection with the accompanying drawings wherein:

FIG. 1 is a front elevational view illustrating a fully automated cake stock dispenser according to the present invention;

FIG. 2 is a fragmentary view illustrating part of the drive included in said dispenser;

FIG. 3 is a side elevational view as viewed in the direction of arrow X in FIG. 1; and FIG. 4 is a view, partly cut away, illustrating another embodiment of the invention wherein a dispenser shown therein is adapted to be manually operated rather than power-operated as in FIG. 1.

Referring to the drawings, a cake stock dispenser according to the invention is composed basically of a pressing-out mechanism A for pressing out a number of lumps of a cake stock at a stroke and a driving mechanism B for actuating the parts of said pressing-out mechanism in operative relation to each other.

As shown in FIG. 1, the aforesaid preessing-out mechanism A comprises a top-opened stock container 2 having a number of restricted openings 1 boared in the bottom thereof, a depressing plate 3 for depressing a cake stock contained in the container, a shutter 4 provided on the lower surface of said container 2 and a stock receiving plate 5 liftably provided below the restricted openings 1. Thus, the stock contained in said container 2 is pressed down by the depressing plate 3 when the shutter 4 is opened so that a predetermined amount of the stock is pressed out in the form of lumps through the restricted openings 1 onto the receiving plate 5 over the entire surface thereof which has just been lifted to the vicinity of the restricted openings. The aforesaid mutually associated movements of the depressing plate 3, shutter 4 and receiving plate 5 will now be described in more detail with reference to FIGS. 1 through 3.

EXAMPLE 1

A double gear as designated at 6 is permanently rotated at low speed by being driven by an electric motor 7 through a reduction gear 8 via a chain 9. A gear 11 is also permanently rotated by the motor 7 through a chain 10. The double gear 6 is loosely mounted on a shaft 12, with a one-revolution clutch mechanism 13 interposed therebetween. As shown in FIG. 2, the one-revolution clutch mechanism comprises a wheel 14 fixed to the shaft 12 and having a plurality of pins 16 received therein at the surface thereof facing the gear 14, said pins being adapted to be free to move back and forth by means of springs 15 received in said surface of the wheel 14 and serving to urge the front ends of the pins into engagement recesses 17 formed in the adjacent surface of the gear 6. The front ends of the pins 16 and the engagement recesses 17 are engaged with each other along bevelled surfaces thereof so that when a clutch lever 49 is in engagement with a projection 50 provided at a location on the peripheral surface of the wheel 14, the front ends of the pins 16 can slip on the engagement recesses 17 against the force of the springs 15 whereby the transmission of power between the gear 6 and the shaft 12 is cut off. That is, normally the clutch lever 49 is in engagement with the projection 50 on the wheel 14 thereby cutting off the transmission of power between the gear 6 and the shaft 12 while the gear 6 is rotating, but when the clutch lever 49 is operated to be disengaged from the projection 50, the pins 16 under action of the springs 15 and thereby resiliently urged into the engagement recesses 17 become effective to establish a state of power transmission between the gear 6 and the wheel 14. In this connection, it will be understood that at this time if the aforesaid clutch lever is brought back to its original position after it is moved away from engagement, the front end of the clutch lever will again abut against the projection 50 of the wheel 14 after the wheel 14 has completed one revolution, whereupon the transmission of power is again cut off. Thus, in FIG. 1 the numeral 18 designates a crank disk fixed to one end of the aforesaid shaft 12 and having a crank pin 19 extending therefrom and pivotally receiving a horizontally extending rod 20, the middle portion of said rod 20 being operatively connected to one end of the aforesaid shutter 4 through an actuator arm 21. Further, fixed to the end of the shaft 12 is a gear 22 which is connected through a chain 23 to a driving gear 25 for a receiving plate-lifting cam disk 24 having a cut-away portion 63. A swing lever 26 has one end thereof contacted with the peripheral surface of said cam disk 24 and the other end thereof operatively connected to the lower end of a receiving plate-lifting shaft 27, whereby the rotation of the cam disk causes the swing lever 26 to be displaced to raise and lower the lifting shaft 27 thereby raising and lowering the receiving plate 5 secured to the top end of the shaft 27.

A limit switch-actuating eccentric wheel 61 is fixed to the aforesaid shaft 12 and there is provided in the path of movement of this wheel a limit switch 28 adapted to be actuated by being contacted with the peripheral surface of said wheel. A solenoid 29 adapted to be actuated by a signal from the limit switch 28 is provided as an operating lever for a depressing plate-driving one-revolution clutch 30, which has the same structure as the previously described one-revolution clutch mechanism 13. Thus, the numeral 31 designates a gear loosely fitted on a shaft 32 and permanently rotated through a chain 32 from the gear 6, and the numeral 34 designates a crank disk provided in juxtaposed relation to the gear 31, with said one-revolution clutch interposed therebetween. A rod 35 extending from a crank pin 36 on said crank disk 34 is operatively connected to a depressing plate-driving gear 39 through a ratchet operating lever 37 and ratchet mechanism 38. The driving gear 39 is operatively connected to a depressing plate-lifting vertical shaft 44 through a chain 40, driven gear 41, and worm and worm wheel unit 42, 43. In addition, in the drawings, the numeral 45 designates a handle for manually raising and lowering the depressing plate, and the numeral 46 designates an operating foot lever.

In the above-mentioned arrangement, the shutter 4 provided on the bottom of the container 2 is normally closed and the receiving plate 5 is normally positioned below the bottom of the container 2 with a suitable distance maintained therebetween. In such condition, the container 2 is suitably charged with a cake stock and the electric motor 7 is energized, followed by the depression of the foot lever 46 thereby to operate the operating lever 49 of the one-revolution clutch 13 through the connecting rods 47 and 48, whereupon the double gear 6 and the shaft 12 are operatively connected so that the shaft 12 will make one complete revolution. The rotation of the shaft 12 causes the rotation of the crank disk 18 so that the crank rod 20 and the actuator arm 21 cooperate with each other to horizontally move the shutter 4 to uncover the restricted openings 1 bored in the bottom of the container 2, while with the rotation of the eccentric wheel 61 the limit switch 28 is pushed by a portion of the eccentric wheel to energize the solenoid 29, which then actuates the depressing plate-driving one-revolution clutch 30 to rotate the crank disk 34 so that the depressing plate-driving gear 39 is rotated through the crank rod 35, ratchet operating lever 37 and ratchet mechanism 38 in proportion to the stroke of said crank rod 35. This rotation of the driving gear causes the depressing plate-lifting vertical shaft 44 to be lowered through the chain 40, driven gear 41 and worm and worm gear unit 42, 43 until the depressing plate fixed to the lower end of said vertical shaft goes down a predetermined distance. Further, substantially concurrently with these operations, the receiving plate-lifting cam disk 24 is rotated by the gear 22 fixed to the shaft 12 through the chain 23 so that the receiving plate 5 is moved upward through the swing lever 26 and the receiving plate-lifting shaft 28 to a position just below the restricted openings 1 of the container 2.

Thus, the cake stock pressed by the depressing plate 3 is extruded through the now-uncovered many restricted openings 1 to provide lumps at a stroke onto the receiving plate 5 which has been raised.

Thereafter, with the rotation of the crank disk 18 and receiving plate-lifting cam shaft 24, the shutter 4 and receiving plate 5 are returned to their original positions, the respective rotation being then stopped owing to the working of the clutch mechanisms 13 and 30 just after the shaft 12 and the crank disk 34 have made one complete revolution.

In connection with the above-mentioned pressing operation of the stock, it is desirable that the depressing plate 3 should be so timed or controlled as to be lowered only after the restricted openings 1 are uncovered, in order to prevent the stock from being compressed. This, in turn, prevents the extinction of the bubbles which have been formed in the stock.

While so far has been described a dispensing apparatus wherein the operations of the opening and closing of the shutter, the lowering of the depressing plate and the raising and lowering of the receiving plate are all automatically effected, it is also possible to so arrange such apparatus to effect these operations manually as described in the following example. Such modified form of the invention will now be described with reference to FIG. 4.

EXAMPLE 2

An operating lever 51 for lowering the depressing plate is so arranged as to rotate a gear 53 by a predetermined number of revolutions through a ratchet mechanism 52. A gear 56 meshes with a gear 55 fixed to a shaft 54 to which said gear 53 is fixed. A lifting shaft 57 is screwed into the central portion of said gear 56 and has the depressing plate 3 fixed to the lower end thereof. An operating lever 58 for opening and closing the shutter is pivotally mounted in a fixed frame portion and has a portion thereof fixed to one end of the shutter 4. A foot lever 59 for raising and lowering the lump receiving plate has its swing end directly connected to the receiving plate-lifting shaft 60.

In the arrangement described above, by utilizing hand and foot to operate the levers 51, 58 and 59 in properly timed relation it is possible to downwardly urge the stock filled in the container so that a predetermined amount of the stock may be pressed out through a number of restricted openings onto the receiving plate positioned therebelow.

An outline of the present invention has so far been described. To sum up, in the present invention, a cake stock is charged in a container 2 having a number of restricted openings formed in the bottom thereof and associated with a shutter, and a depressing plate is caused to press the stock so that a number of lumps are pressed out at a stroke through said restricted openings onto a lump receiving plate positioned therebelow. By virtue of this arrangement, it is possible for any person to produce a number of standardized highly accurate undried cakes at a time. Further, since the receiving plate is raised to a position immediately below the restricted openings of the time of pressing-out, the extruded lumps can be dependably received thereon without any possibility of causing the deformation thereof. Particularly, if the arrangement is designed as in Example 1, there is obtained a great advantage in that the operations of the opening and closing of the shutter, the lowering of the depressing plate and the raising and lowering of the receiving plate can be automatically effected in properly timed relation by manipulating a single operating element without requiring any troublesome operation of the parts, so that even an unskilled operator can easily operate the machine to continuously produce cakes in large quantities.

What I claim is:

1. In a cake stock dispensing apparatus comprising a cake stock container having a number of restricted openings in the bottom thereof, a shutter movable transversely across the bottom of said container for opening and closing said opening, a depressing plate in said container for downwardly urging a cake stock contained in said container, a liftable receiving plate positioned below said restricted openings for receiving lumps of the cake stock extruded through said restricted openings, and a shutter shifting mechanism, a depressing plate raising and lowering mechanism, a receiving plate raising and lowering mechanism, and a driving system coupled to said mechanisms for driving said shutter, depressing plate and receiving plate in cooperation with each other, said driving system consisting of a motor, a one-revolution clutch adapted to be automatically stopped after making one complete revolution operatively connected to said motor, a rotary shaft driven by said clutch, a crank disk fixed on one end of said rotary shaft and a crank rod having one end connected to said crank disk, said shutter shifting mechanism having an actuator arm operatively connected to one end of said shutter and the middle portion of said crank rod arm, a gear fixed to the other end of the rotary shaft, a chain around said gear, said receiving plate raising and lowering mechanism having a receiving plate-lifting cam disk, a driving gear connected to said cam disk and driven by said chain, a limit switch-actuating eccentric wheel fixed to the rotary shaft, a limit switch in the path of said eccentric wheel and a solenoid energized thereby, the depressing plate raising and lowering mechanism being actuated by said solenoid, and an operating foot lever coupled to and actuating said one-revolution clutch for said rotary shaft, whereby said crank disk, gear, and limit switch-actuating eccentric wheel are cooperatively driven from only the one rotary shaft.

2. A cake stock dispensing apparatus as claimed in claim 1, wherein said one-revolution clutch has a clutch lever, an operating foot lever and a projection on the peripheral surface of said limit switch-actuating eccentric wheel actuated by said clutch lever, and connecting rods connecting said clutch lever and said foot lever.

References Cited

UNITED STATES PATENTS

| | | | |
|---|---|---|---|
| 774,204 | 11/1904 | Sampson | 107—29 |
| 780,675 | 1/1905 | Lerche | 107—27 |
| 792,831 | 6/1905 | Kirkpatrick | 192—33 XR |
| 2,915,160 | 12/1959 | Schneider | 192—33 XR |
| 3,291,269 | 12/1966 | Merta | 192—33 XR |

WALTER A. SCHEEL, *Primary Examiner.*

A. O. HENDERSON, *Assistant Examiner.*